(12) United States Patent
Zaydman

(10) Patent No.: US 10,795,821 B2
(45) Date of Patent: Oct. 6, 2020

(54) MEMORY EFFICIENT KEY-VALUE STORE

(71) Applicant: VMware, Inc., Palo Alto, CA (US)

(72) Inventor: Oleg Zaydman, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/209,812

(22) Filed: Dec. 4, 2018

(65) Prior Publication Data

US 2020/0174934 A1    Jun. 4, 2020

(51) Int. Cl.
*G06F 12/08* (2016.01)
*G06F 12/0864* (2016.01)
*G06F 12/0868* (2016.01)
*G06F 16/901* (2019.01)

(52) U.S. Cl.
CPC ...... *G06F 12/0864* (2013.01); *G06F 12/0868* (2013.01); *G06F 16/9014* (2019.01); *G06F 2212/1044* (2013.01); *G06F 2212/6032* (2013.04)

(58) Field of Classification Search
CPC ......... G06F 12/0864; G06F 2212/6032; G06F 12/0868; G06F 16/9014; G06F 2212/1044
USPC ........................................................ 711/128
See application file for complete search history.

(56) References Cited

U.S. PATENT DOCUMENTS

2017/0242792 A1 *  8/2017  Matsumoto ......... G06F 12/0802
2018/0253438 A1    9/2018  Zaydman

* cited by examiner

*Primary Examiner* — Hua J Song (74) *Attorney, Agent, or Firm* — Fish & Richardson P.C.

(57) ABSTRACT

A computer system performs a technique for reducing memory usage when a key-value store is being implemented. A first key associated with data is received. A block address of a block of keys is obtained from memory. The block of keys is stored on disk storage, and the keys in the block of keys correspond to respective values stored on the disk storage. The block of keys is obtained from the disk storage using the block address. A second key in the block of keys is located. Locating the second key includes determining that the second key matches the first key. A value of the respective values is obtained using the second key.

21 Claims, 5 Drawing Sheets

FIG. 3

MEMORY EFFICIENT KEY-VALUE STORE

TECHNICAL FIELD

The present disclosure relates generally to reducing memory usage, and more specifically to techniques for reducing memory usage of a key-value store.

BACKGROUND

Distributed-computing systems allow multiple clients in a network to access a pool of shared resources. In some instances, a key-value store relates a key value to corresponding data or a storage address. However, in some instances, the key-value store can consume an excessive amount of memory, which hinders the performance of clients on the network.

SUMMARY

Described herein are techniques for reducing memory and processing resources consumed when implementing a key-value store. With these techniques, excessive consumption of resources is avoided, thereby improving performance for clients that share common resources.

Some embodiments described below address the problem of a key-value store consuming an excessive amount of memory. Storing keys and/or values in memory can require a lot of memory due to both the size and number of the keys and/or values. Instead of storing keys and/or values in memory, the keys (e.g., hash of a segment of disk storage) and values (e.g., a segment of disk storage) are initially stored on disk storage. To access the keys stored on the disk storage, a node uses an address corresponding to the keys, where the address is stored in memory. Because an address of a key is smaller than the key itself, memory is conserved by storing the address instead of the key. Further, the address is not an address of an individual key. Instead, the address is an address of a block of keys, thereby further reducing the amount of memory that is needed. That is, fewer distinct addresses are needed, so each address can be encoded more compactly, thereby saving memory. Notably, the node can determine the address of the value using the address of the block of keys. Because data in segments of disk storage are likely to be boundary aligned in disk images (e.g., virtual disk images), the node can calculate the address of the value using the address of the block of keys, as further described below. Using the calculated address of the value, the node can locate and retrieve the value from disk storage.

DETAILED DESCRIPTION

In the following description, for purposes of explanation, numerous examples and details are set forth in order to provide an understanding of various embodiments. However, certain embodiments can be practiced without some of these details, or can be practiced with modifications or equivalents thereof.

Figure 1:
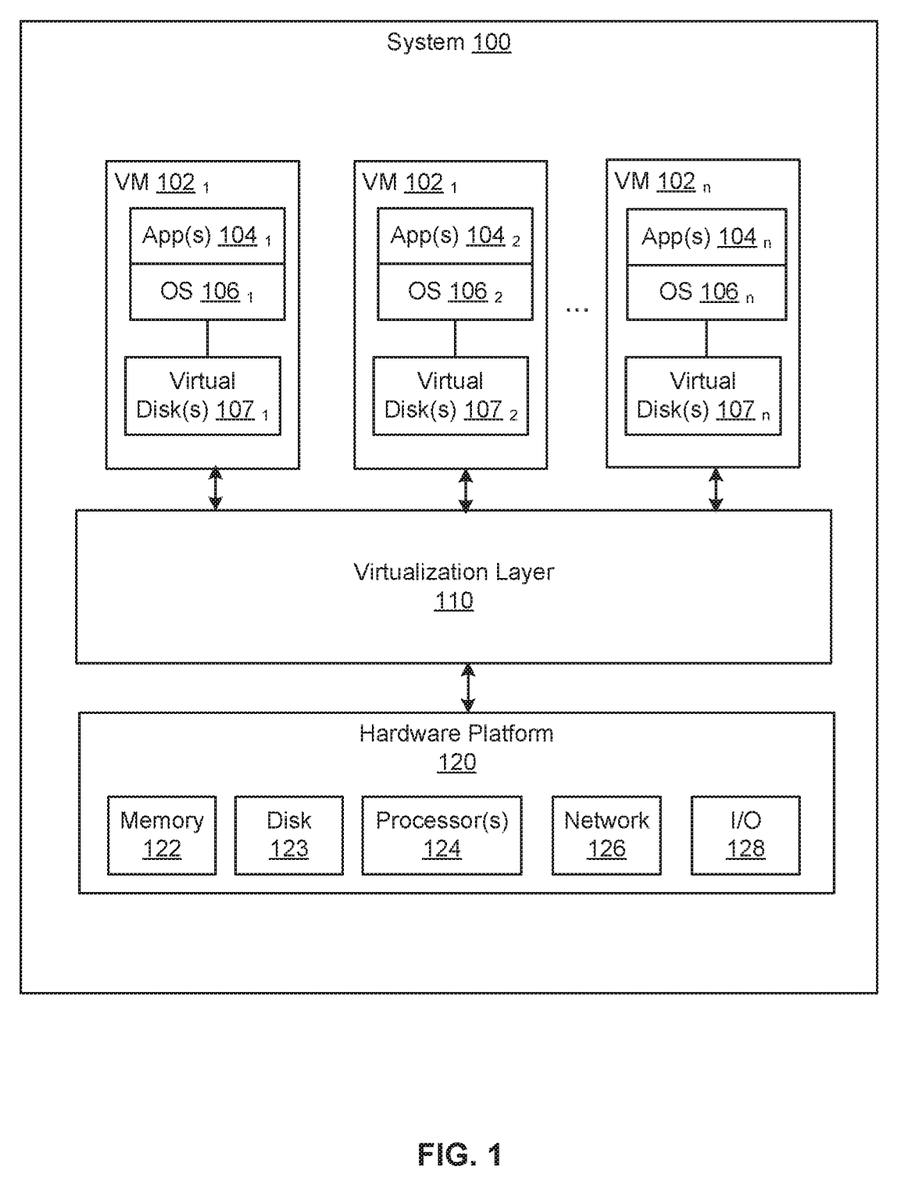
FIG. 1 is a block diagram illustrating components of a distributed-computing system, in accordance with some embodiments.

FIG. 1 is a block diagram illustrating a system and/or environment for implementing various components of a distributed-computing system, according to some embodiments. As shown, virtual machines (VMs) $102_1$, $102_2$, ... $102_n$ (VMs 102) are instantiated on system 100. Hardware platform 120 includes memory 122, disk storage 123, processor(s) 124, network interface 126, and various I/O devices 128. In some embodiments, memory 122 includes volatile memory (e.g., high-speed random access memory). In some embodiments, disk storage 123 includes non-volatile memory (e.g., magnetic disk storage devices, flash memory devices, or other non-volatile solid-state memory devices). In some embodiments, memory 122 and/or disk storage 123 includes a computer-readable storage medium. In some embodiments, the computer-readable storage medium is tangible and non-transitory. In some embodiments, the computer-readable storage medium is transitory. In some embodiments, the computer-readable storage medium stores instructions for performing the methods and processes described herein. In some embodiments, hardware platform 120 also includes other components, including power supplies, internal communications links and buses, peripheral devices, controllers, and many other components.

In the embodiment of FIG. 1, virtualization layer 110 is installed on top of hardware platform 120. Virtualization layer 110, also referred to as a hypervisor, is a software layer that provides an execution environment within which VMs 102 are instantiated and executed. The execution environment of VMs 102 includes virtualized components analogous to those comprising hardware platform 120 (e.g. virtualized processor(s), virtualized memory, virtualized disk storage, etc.). In this manner, virtualization layer 110 abstracts VMs 102 from physical hardware while enabling VMs 102 to share the physical resources of hardware platform 120. As a result of this abstraction, VMs 102 operate as though it has its own dedicated computing resources.

Each of VMs 102 includes an operating system (OS) (e.g., OS $106_1$-$106_n$), also referred to as a guest OS, and application(s) 104 (e.g., app(s) $104_1$-$104_n$) running on or within the operating system. In some embodiments, the OS and/or application(s) are stored on virtual disk(s) $107_1$, $107_2$, ... $107_n$ (virtual disk(s) 107). In some embodiments, the OS (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components. In some embodiments, as in a traditional computing environment, the OS provides the interface between the one or more applications and the hardware resources used to execute or run applications. In some embodiments, the "hardware" (e.g., virtual disk(s) 107) is virtualized or emulated by virtualization layer 110. Consequently, the one or more applications generally operate as though they are in a traditional computing environment. That is, from the perspective of the one or more applications, the OS appears to have access to dedicated hardware analogous to components of hardware platform 120.

In some embodiments, a virtual network consists of VMs 102 that can transmit data to and receive data from one another. Each virtual machine optionally represents a single computer within the virtual network. In some instances, it is desirable to migrate (e.g., transfer, copy) an image of a virtual disk (e.g., virtual disk(s) $107_1$) from a source node (e.g., VM $102_1$) to a destination node (e.g., VM $102_2$). In some embodiments, a node (e.g., source node, destination node) can be a physical computing device, a virtual computing instance (e.g., a VM or container), part of a physical computing device or virtual computing instance, or span multiple physical computing devices or virtual computing instances (or combinations thereof). In some embodiments, a disk image contains the contents of some, or all, of a virtual disk (e.g., virtual disk(s) $107_1$, virtual disk(s) $107_2$). For example, a source disk image is a disk image of a virtual disk at a source node, while a destination disk image is a disk image of a virtual disk at a destination node. Since a source disk image can contain all the contents of an entire virtual disk, the source disk image can be very large in size. Due to the large size of some source disk images, migrating disk images can result in excessive consumption of resources, such as network bandwidth, thereby causing network congestion.

Figure 2A:
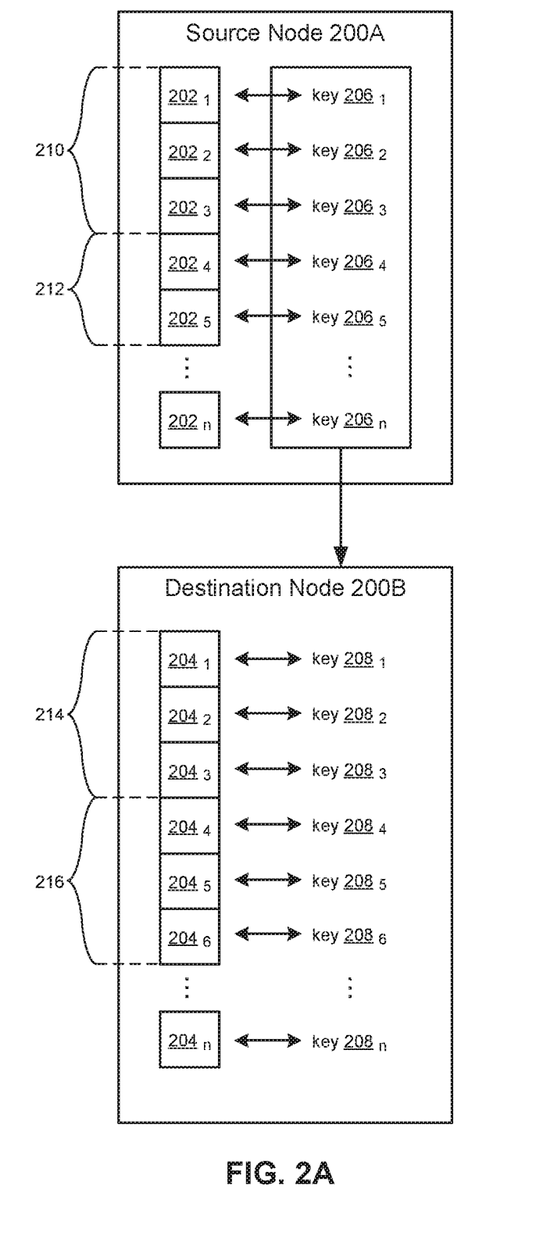
FIGS. 2A-2C are block diagrams illustrating a system for implementing a key-value store to migrate disk image(s) from a source node to a destination node.

FIG. 2A is a block diagram illustrating a system and/or environment for implementing a key-value store to facilitate migration of disk image(s) from a source node to a destination node. As described above, migration of disk image(s) can cause network congestion due to consumption of network bandwidth. To alleviate network congestion, a key-value store is used to compare keys (e.g., hashes) of disk image segments (e.g., values) at the source node and the destination node. If a match is found, then the corresponding disk image segment does not need to be transferred from the source node to the destination node, as the match indicates that the corresponding disk image segment already exists at the destination node.

Figure 2B:
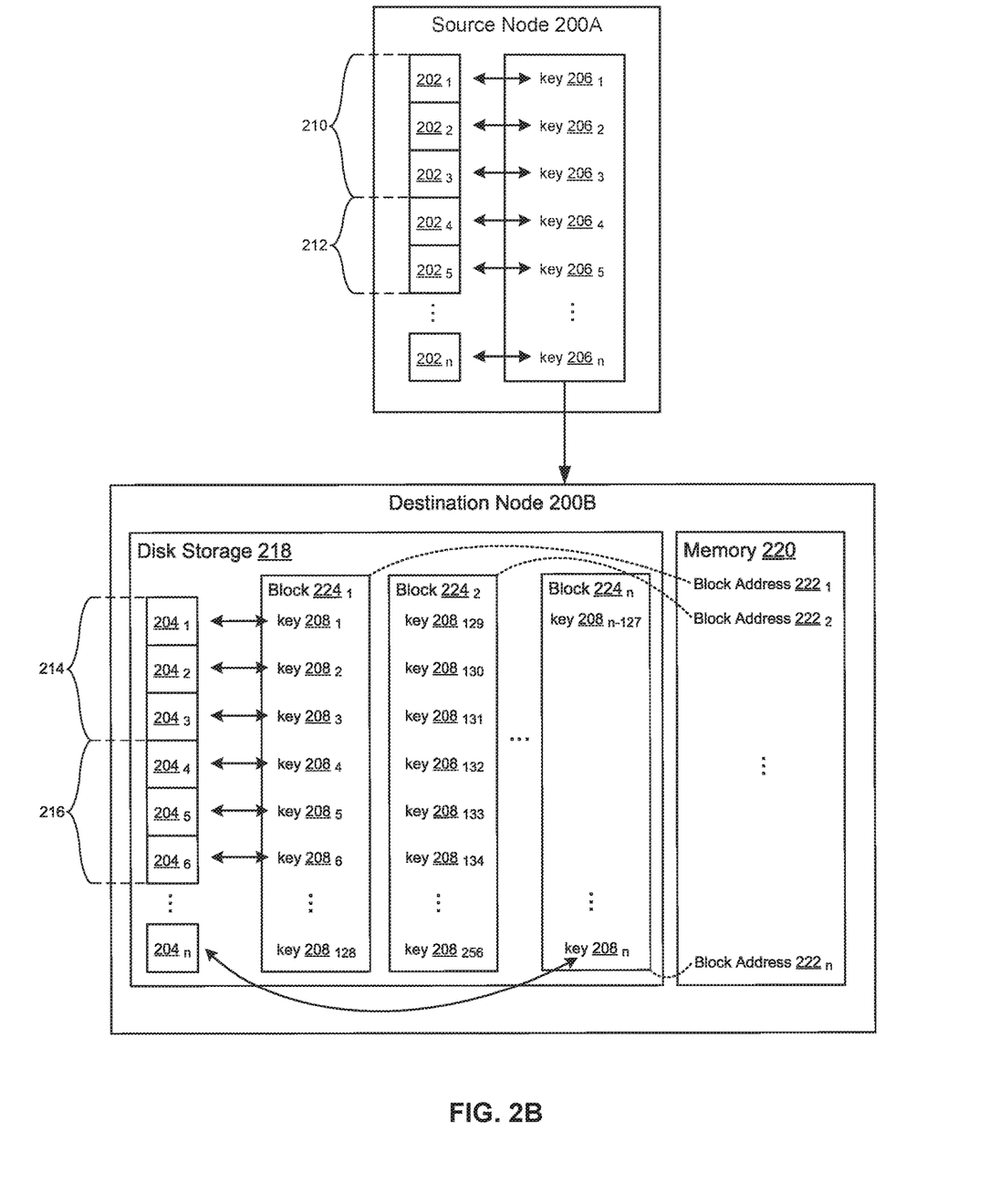
Figure 2C:
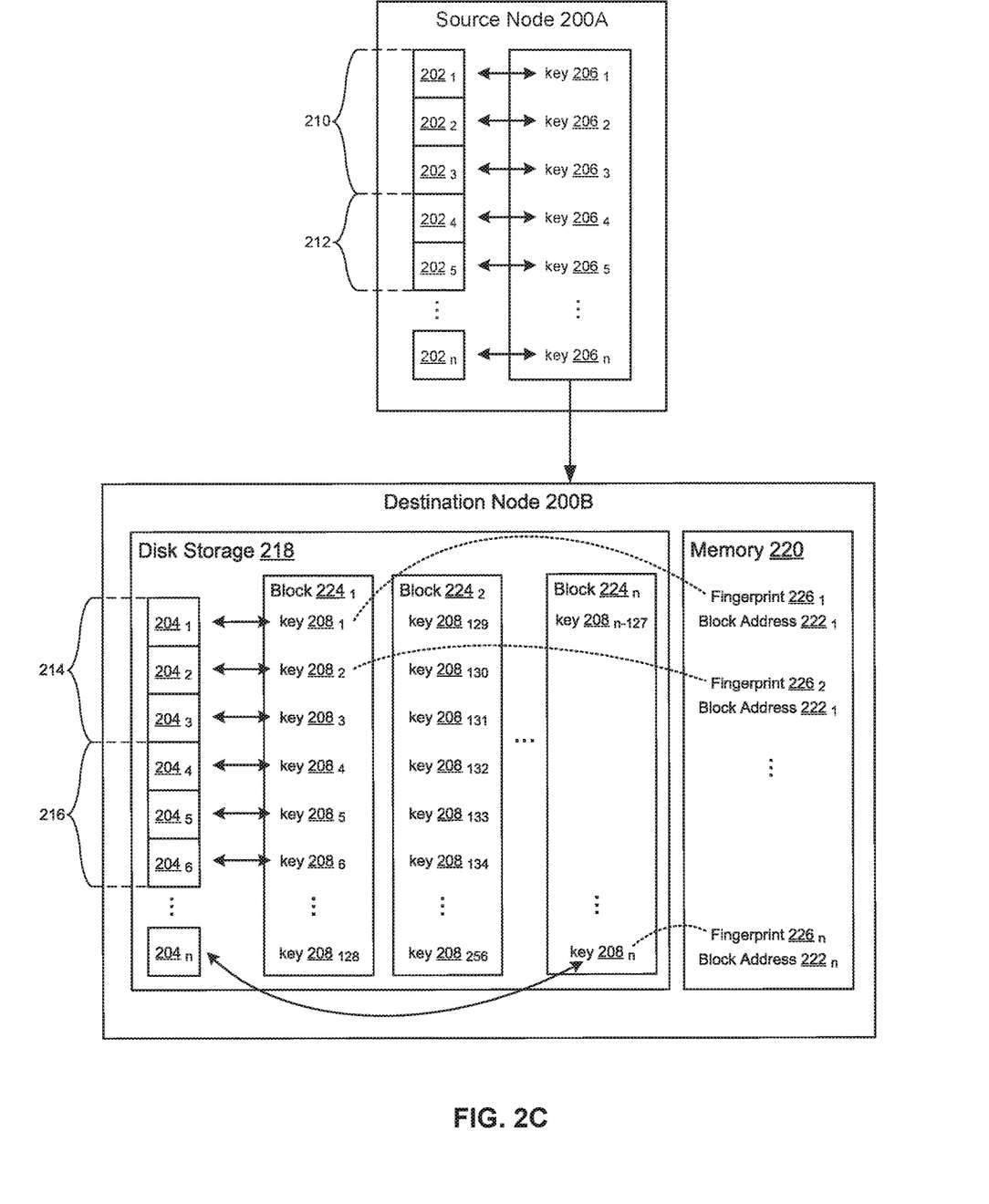

In the embodiments of FIGS. 2A-2C, a process is initiated to migrate a disk image from source node 200A to destination node 200B. The source disk image includes files corresponding to, for example, an OS and/or application(s). In some embodiments, the files in the source disk image can be found in destination node 200B before migrating the source disk image. For example, if source node 200A and destination node 200B are using the same OS (e.g., Microsoft Windows), then many files (e.g., DLL files) in the source disk image already exist on destination node 200B. As another example, source node 200A and destination node 200B can have common applications, which would also result in files in the source disk image already existing on destination node 200B. If destination node 200B can determine which files already exist on the destination node, then the amount of data that needs to be migrated can be reduced by avoiding migration of files that already exist on destination node 200B.

To determine which files already exist on destination node 200B, destination node 200B compares segments of the source disk image with segments of the destination disk image. A disk image consists of segments (e.g., segments of data or content). For example, the source disk image consists of segments $202_1$, $202_2$, . . . $202_n$ (segments 202). A file on a disk image occupies one or more segments. As indicated by FIG. 2A, source file 210 occupies segments $202_1$-$202_3$, and source file 212 occupies segments $202_4$-$202_5$. In some embodiments, each segment of segments 202 is the smallest (e.g., minimum) addressable block (e.g., sector, unit) of disk storage. For example, a segment is 4096 bytes in size. In some embodiments, the size of each segment is a multiple of the smallest addressable block of disk storage.

Keys $206_1$, $206_2$, . . . $206_n$ (keys 206) are hashes of segments 202. For example, key $206_1$ is a hash of the data or content in segment $202_1$. A hash is a unique identifier of a disk image segment, where the hash is generated using a hash function. Accordingly, if hashes of two different segments match, then it is very likely that the data in those segments are identical. Conversely, if hashes of two different segments do not match, then it is certain that the data in those segments are not identical. Additionally, keys 206 correspond to values (e.g., segments 202). Thus, by implementing a key-value store, keys 206 can be used to locate and/or retrieve values (e.g., segments 202). For example, key $206_1$ can be used to locate and/or retrieve a value (e.g., segment $202_1$). In some embodiments, source node 200B generates keys 206 prior to the request to migrate the source disk image from source node 200A to destination node 200B. In other embodiments, source node 200B generates keys 206 in response to, or after, the request to migrate the source disk image.

Similar to the source disk image, the destination disk image includes segments $204_1$, $204_2$, . . . $204_n$ (segments 204). As described earlier, a file on a disk image occupies one or more segments. As indicated by FIG. 2A, destination file 214 occupies segments $204_1$-$204_3$, and destination file 216 occupies segments $202_4$-$202_6$. In some embodiments, each segment of segments 204 is the smallest (e.g., minimum) addressable block (e.g., sector) of disk storage. For example, a segment is 4096 bytes in size. Optionally, each segment is a size that is a multiple of the smallest addressable block of disk storage. As used in the description and the figures, the index parameter (e.g., n) can represent different integers even when the same index parameter is used for different concepts. For example, source node 200A and destination node 200B can have a different number of segments and/or keys.

Analogous to keys 206, keys $208_1$, $208_2$, . . . $208_n$ (keys 208) are hashes of segments 204. For example, key $208_1$ is a hash of the data or content in segment $204_1$. Further analogous to keys 206, keys 208 correspond to values (e.g., segments 204). Thus, keys 208 can be used to locate and/or retrieve values (e.g., segments 204). For example, key $208_1$ can be used to locate and/or retrieve a value (e.g., segment $204_1$). In some embodiments, destination node 200B generates keys 208 prior to the request to migrate the source disk image from source node 200A to destination node 200B. In other embodiments, destination node 200B generates keys 208 in response to, or after, the request to migrate the source disk image.

In the embodiment of FIG. 2A, destination node 200B receives keys 206 from source node 200A. In some embodiments, upon (e.g., after) receiving the keys from source node 200A, destination node 200B performs a comparison between the keys of the source disk image (e.g., keys 206) and the keys of the destination disk image (e.g., keys 208). When disk images are large in size, the number of comparisons between keys that need to be performed is considerable. As a result, it is beneficial to store the keys in memory to avoid disk storage accesses. However, storing the keys in memory requires a lot of memory if there is a large number of keys. Excessive consumption of memory can result in poor performance for the virtual machines, as there is less physical memory available for the virtual machines to use.

FIG. 2B is a block diagram illustrating an implementation of a key-value store that reduces the amount of memory needed to perform comparisons between keys. Storing the keys of the destination disk image (e.g., keys 208) in memory (e.g., 220) can require a lot of memory due to both the size of the keys and the large number of keys. In the embodiment of FIG. 2B, instead of storing keys and/or values in memory (e.g., 220), keys and/or values are stored on disk storage (e.g., 218). For example, destination node 200B stores the keys on disk storage 218 instead of in memory 220. To access the keys stored on disk storage 218, destination node 200B uses an address corresponding to the keys. Notably, the address is not an address of an individual key of keys 208. Instead, the address is an address of a block of keys (e.g., keys corresponding to a file containing multiple values or segments) stored on disk storage, thereby further reducing the amount of memory that is needed.

At FIG. 2B, destination node 200B receives keys 206 of the source disk image from source node 200A. Upon (e.g., after) receiving keys 206, destination node 200B obtains a block address from memory 220. For example, destination node 200B obtains block address $222_1$ from memory 220. Block address $222_1$ is an address of block $224_1$, which is a block of keys stored on disk storage 218. For example, block $224_1$ includes a portion of keys 208. As indicated by FIG. 2B, block $224_1$ includes the first 128 keys of keys 208, block $224_2$ includes the second 128 keys of keys 208, and block $224_n$ includes the last 128 keys of keys 208. In some embodiments, the last block (e.g., block $224_n$) includes less than 128 keys. It can be advantageous to include 128 keys in a single block of keys. As noted earlier, a segment can be the smallest addressable block of disk storage. In the embodiment of FIG. 2B, a segment is 4096 bytes in size, and a key is 32 bytes in size. Given that a key is 32 bytes in size, the maximum number of keys that can occupy a single segment is 128 keys. That is, 128 keys in a block of keys is a total of 4096 bytes in size, which is the same as the size of a segment. By matching the number of keys in a block of keys with the smallest addressable block size, the number of potential I/O requests to access the keys is reduced, thereby avoiding unnecessary transfers of data.

At FIG. 2B, destination node 200B obtains, using the block address (e.g., $222_1$), the corresponding block of keys (e.g., block $224_1$) from disk storage 218. Obtaining the block of keys includes reading the block of keys into memory 220. Once the block of keys is read into memory 220, destination node 200B compares (e.g., attempts to match) the keys received from source node 200A (e.g., keys 206) with the keys in the block of keys. In the embodiment of FIG. 2B, destination node 200B compares a first key (e.g., key $206_1$) with the keys in block $224_1$. In some embodiments, one or more of keys 206 are stored in memory (e.g., 220) for comparison purposes.

If destination node 200B determines that a match does not exist between the first source key (e.g., $206_1$) and any one of the keys in block $224_1$, destination node 200B obtains the next block of keys and performs the comparison using the next block of keys. This process continues until a match is found or every block of keys has been compared against the first source key. For example, upon (e.g., after) determining that a match does not exist between source key $206_1$ and any one of the destination keys in block $224_1$, destination node 200B obtains a second block address from memory 220. Specifically, destination node 200B obtains block address $222_2$, which is used to obtain block $224_2$ from memory 220. As described above, once block $224_2$ is read into memory 220, destination node 200B compares key $206_1$ with the destination keys in block $224_2$. This process repeats until the first source key (e.g., $206_1$) is matched with a destination key or is compared against every destination key in the block of keys stored on disk storage 218.

If source file 210 is not stored anywhere at destination node 200B, then none of the segments of source file 210 would be found at destination node 200B. As a result, destination node 200B determines that a match does not exist between the first source key (e.g., $206_1$) and any one of the keys in the block(s) of keys stored on disk storage 218. Upon (e.g., after) making this determination, destination node 200B requests that source node 200A transmits to destination node 200B the value (e.g., segment) corresponding to the source key (e.g., $206_1$) with no match. Since there is no match, in order to successfully migrate the source disk image, destination node 200B requests the segment (e.g., a copy of the segment) that is missing from the destination node. Once destination node 200B receives the requested segment, destination node 200B uses the segment to assemble a portion of a file (e.g., a copy of the file) at destination node 200B. For example, destination node 200B forms a portion of source file 210 at destination node 200B using the requested segment. In some embodiments, destination node 200B stores the received segment on disk storage 218. In some embodiments, upon (e.g., after) using the segment to assemble a portion of a copy of source file 210, destination node 200B proceeds to the next source key (e.g., $206_2$) to perform the processes described above with respect to source key $206_1$.

Conversely, if source file 210 already exists at destination node 200B, then destination node 200B uses the existing file. For example, source file 210 is identical to destination file 214, which is stored at destination node 200B. As a result, destination node 200B determines that a match exists between the first source key (e.g., $206_1$) and one of the keys in the block of keys (e.g., $208_1$). Upon making this determination, destination node 200B uses the segment that already exists in the destination node corresponding to the matched key in the block of keys in order to assemble a portion of a file (e.g., a copy of the file) at destination node 200B. That is, destination node 200B uses the matched key (e.g., $208_1$) to retrieve the corresponding value (e.g., segment $204_1$). To retrieve the value, destination node 200B can determine the address of the value using a formula that takes advantage of boundary-aligned data on segments. The formula to calculate the value address is as follows:

$$\text{value address} = \text{block address} * \text{block size} + \text{key position}$$

where the block address is the address of the block of keys, the block size is the number of keys in the block of keys, and the key position is the position of the matched key in the block of keys. As an example, having determined that a match exists between source key $206_1$ and key $208_1$ in the block of keys, destination node 200B can determine the address of the value corresponding to the matched key (e.g., key $208_1$) using the above formula. In this example, suppose the block address is 0 (due to block $224_1$ being the first block of keys), the block size is 128 (due to there being 128 keys in block $224_1$), and the key position is 0 (due to key $208_1$ being the first key in block $224_1$. With these inputs, the calculated address of the value corresponding to the matched key is 0. Using logical block addressing (LBA), for example, the addresses of segments $204_1$, $204_2$, and $204_3$ are 0, 1, and 2, respectively. Accordingly, destination node 200B retrieves, using the calculated address value, segment $204_1$, which has a value address of 0. The above example illustrates that the block address can be used to derive the value address. This is advantageous because more space in memory is saved. Since the value address can be derived from the block address, the value address does not need to be stored in memory, thereby resulting in additional savings in memory.

Upon (e.g., after) retrieving the value using the value address, destination node 200B forms a portion of a copy of source file 210 at destination node 200B using segment $204_1$. By using the segment already located at destination node 200B, data transmission across the network is avoided. In some embodiments, upon (e.g., after) using the segment to assemble a portion of source file 210, destination node 200B proceeds to the next source key (e.g., $206_2$) to perform the processes described above with respect to source key $206_1$. In some embodiments, the processes described above repeat until the source disk image is successfully migrated to destination node 200B.

In the embodiment of FIG. 2B, each block of keys is sequentially checked for a match until either a key that matches the source key is found within the block, or a key that matches the source key is not found after checking all the keys in the block. For example, destination node 200B starts with the first block of keys (e.g., $222_1$). Destination node 200B then determines whether a source key matches any of the keys in that first block. Before the keys in the first block of keys are read into memory, it is not known whether destination node 200B will be able to locate a key in the first block of keys that matches the source key. Accordingly, it is possible that many blocks of keys are checked before a match is found. To address this issue, a fingerprint can be used to probabilistically predict which block of keys includes a key that matches the source key.

FIG. 2C is a block diagram illustrating an implementation of a key-value store that uses a fingerprint of a key to reduce the number of potential I/O requests. In the embodiment of FIG. 2C, a fingerprint is stored with the block address in memory, where the fingerprint corresponds to (e.g., is associated with) a block address. Further, each key in the block of keys has a corresponding fingerprint. The fingerprint (e.g., $226_1$) is a hash of a key (e.g., $208_1$), which results in a fingerprint that is smaller in size than the key. For example, the fingerprint can be the first 8 bits of the key. Accordingly, storing the fingerprint in memory instead of the key itself results in savings in memory.

With the fingerprints stored in memory, destination node 200B can use the fingerprints to probabilistically predict which block of keys contains the source key. In the embodiment of FIG. 2C, when destination node 200B attempts to match source key $206_1$ with a key at destination node 200B, destination node 200B compares a fingerprint of source key $206_1$ with the fingerprints stored in memory 220. If there is a match, then it is very likely that source key $206_1$ can be found in the block of keys corresponding to the matched fingerprint. Accordingly, destination node 200B uses the block address associated with the matched fingerprint to retrieve a block of keys for comparison purposes. Conversely, if there is no match, then it is certain that source key $206_1$ cannot be found in the block of keys stored on disk storage 218. In some instances, false positives can occur, where there is a match between the fingerprints even though their corresponding keys do not match. However, if the keys are sufficiently random and an 8-bit fingerprint is used, the chance of a false positive is less than 1%.

The embodiments described above implement a key-value store to facilitate migration of disk image(s) from a source node to a destination node. Notably, in some embodiments, the source node is the same as the destination node. Accordingly, migration optionally occurs from one disk image at the destination node to another disk image at the destination node. Furthermore, although the embodiments described above implement a key-value store in the context of facilitating migration of disk image(s), the described techniques can be applied more generally to other contexts that involve a key-value store (e.g., I/O operations that may or may not include migration of disk images(s)).

Figure 3:
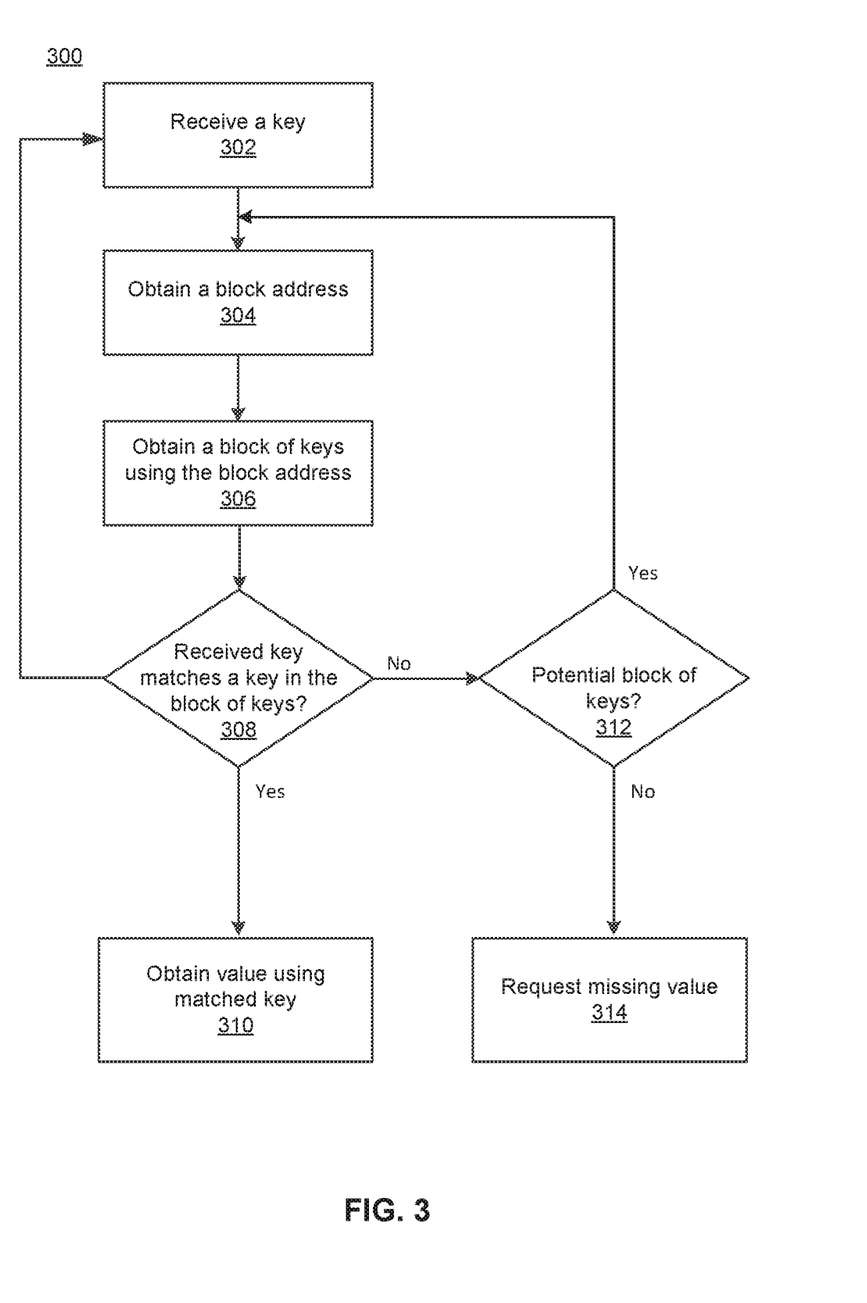
FIG. 3 illustrates a flow diagram of an exemplary process for implementing a key-value store to migrate disk image(s) from a source node to a destination node, in accordance with some embodiments.

FIG. 3 is a flow diagram illustrating method 300 for implementing a key-value store (e.g., to facilitate migration of disk image(s) from a source node to a destination node). In some embodiments, the method is performed by destination node 200B. In some embodiments, the source node is a node that is different from the destination node. In some embodiments, the source node is the same node as the destination node. In some embodiments, system 100 includes instructions for performing method 300. For example, a virtualization software that resides in system 100 includes instructions for performing method 300.

At block 302, a node (e.g., 200B) receives a first key (e.g., $206_1$-$206_n$) associated with data (e.g., content or data in a segment (e.g., $202_1$-$202_n$)). In some embodiments, a destination node receives the first key from a source node (e.g., 200A). In some embodiments, the source node is the same node as the destination node, and thus, the disk image is also at the destination node. In some embodiments, the first key is a hash (e.g., unique identifier) of a segment (e.g., $202_1$) of a disk image (e.g., an image of a virtual disk (e.g., $107_1$-$107_n$)) at the source node. In some embodiments, the first key corresponds to a file on a disk image.

At block 304, the node (e.g., 200B) obtains (e.g., receives), from memory (e.g., 220), a block address (e.g., $222_1$-$222_n$) of a block of keys (e.g., $224_1$-$224_n$), where the block of keys is stored on disk storage (e.g., 218), and the keys (e.g., $208_1$-$208_n$) in the block of keys correspond to respective values (e.g., $204_1$-$204_n$) stored on the disk storage. In some embodiments, the size of the block of keys on the disk storage corresponds to the minimum addressable amount of data on the disk storage. In some embodiments, the disk storage (e.g., 218) includes virtual disk(s) to which space on physical disk storage (e.g., 123) is allocated. In some embodiments, memory (e.g., 220) includes virtual memory to which an amount of physical memory (e.g., 122) is allocated. In some embodiments, a destination node (e.g., 200B) generates the block addresses prior to the request to migrate the source disk image from a source node (e.g., 200A) to the destination node. In other embodiments, the destination node generates the block addresses in response to, or after, the request to migrate the source disk image.

At block 306, the node (e.g., 200B) obtains (e.g., receives), from the disk storage (e.g., 218), the block of keys (e.g., $224_1$-$224_n$) using the block address (e.g., $222_1$-$222_n$). In some embodiments, the block of keys includes a plurality of keys.

At block 308, the node (e.g., 200B) determines whether the first key (e.g., $206_1$-$206_n$) matches any of the keys (e.g., $208_1$-$208_n$) in the block of keys. In some embodiments, the node locates a second key (e.g., $208_1$-$208_n$) in the block of keys, wherein locating the second key includes determining that the second key matches the first key. In some embodiments, the second key corresponds to an address of the value (e.g., $204_1$-$204_n$). In some embodiments, determining the address of the value includes using a position (e.g., relative position, location) of the second key in the block of keys, a total number of keys in the block of keys, and the block address (e.g., $222_1$-$222_n$) of the block of keys. In some embodiments, locating the second key in the block of keys includes searching the block of keys after the block of keys are read from the disk storage (e.g., 218) and stored in memory (e.g., 220). In some embodiments, the block of keys is searched while the block of keys (e.g., keys in the block of keys) is stored in memory. In some embodiments, the second key (e.g., $208_1\text{-}208_n$) is not stored in memory (e.g., 220).

At block 310, upon (e.g., after) a determination that the first key matches a key in the block of keys, the node (e.g., 200B) obtains a value (e.g., $204_1\text{-}204_n$) of the respective values using the second key (e.g., $208_1\text{-}208_n$). In some embodiments, obtaining the value includes using the address of the value to obtain the value. In some embodiments, the block of keys (e.g., $224_1\text{-}224_n$) and the value are stored in different files (e.g., segments). In some embodiments, the block of keys occupies a single segment on the disk storage. In some embodiments, the value is, or corresponds to, a single segment on the disk storage. In some embodiments, the value is obtained from disk storage (e.g., 218). In some embodiments, the value is not obtained from memory (e.g., 220).

At block 312, upon (e.g., after) a determination that the first key (e.g., $206_1\text{-}206_n$) does not match any of the keys (e.g., $208_1\text{-}208_n$) in the block of keys, the node (e.g., 200B) proceeds to determine whether there is a potential block of keys (e.g., $224_1\text{-}224_n$) that could include the first key. In the embodiment of FIG. 2B, where a fingerprint is not used, a node (e.g., 200B) determines that a potential block of keys exists when there is a block of keys that has yet to be checked. Conversely, the node determines that a potential block of keys does not exist when there is no remaining block of keys that has yet to be checked.

In the embodiment of FIG. 2C, where a fingerprint (e.g., $226_1\text{-}226_n$) is used, a node (e.g., 200B) determines that the first key matches a key in the block of keys when a fingerprint of the first key matches a fingerprint of a key in the block of keys (e.g., stored in memory 220). Conversely, the node determines that the first key does not match a key in the block of keys when a fingerprint of the first key does not match a fingerprint of a key in the block of keys. In some embodiments, fingerprints of the keys in the block of keys are stored in memory. In some embodiments, fingerprints of the keys are not stored on disk storage (e.g., 218). In some embodiments, a fingerprint corresponds to (e.g., is associated with) a block address (e.g., $222_1\text{-}222_n$). In some embodiments, a fingerprint corresponds to (e.g., is associated with) a value address. In some embodiments, in accordance with a determination that a fingerprint of the first key matches a fingerprint of a key in the block of keys, the node (e.g., 200B) obtains the value address or block address that corresponds to the matched fingerprint. In some embodiments, in accordance with a determination that the fingerprint of the first key does not match the fingerprint of the key in the block of keys, the node (e.g., 200B) proceeds to a fingerprint of a different key in the block of keys for comparison with the fingerprint of the first key, which avoids going to disk storage (e.g., 218).

In some embodiments, upon (e.g., after) a determination that a potential block of keys exists, the node (e.g., 200B) proceeds to block 304.

At block 314, upon (e.g., after) a determination that a potential block of keys does not exist, the node (e.g., 200B) requests a missing value (e.g., $202_1\text{-}202_n$) (e.g., from the source node (e.g., 200A)). In some embodiments, the node uses the requested value (e.g., received from the source node) to generate (e.g., form, create) a portion of a file (e.g., a copy of a file) or a segment (e.g., a copy of a segment). In some embodiments, the value is used to generate a portion of a copy of the file on the disk image.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more transitory or non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), NVMe, Non-Volatile Memory, a CD (Compact Disc) (e.g., CD-ROM, CD-R, CD-RW, etc.), a DVD (Digital Versatile Disc), a Blu-Ray Disc, a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

What is claimed is:
1. A computer system, comprising:
one or more processors; and
memory storing one or more programs configured to be executed by the one or more processors, the one or more programs including instructions for:
receiving a first key associated with data;

obtaining, from memory, a block address of a block of keys, wherein the block address corresponds to an address on disk storage corresponding to the block of keys, and wherein each key of a plurality of keys in the block of keys correspond to a respective value stored on the disk storage;

obtaining, from the disk storage, the block of keys using the block address;

locating a second key in the block of keys, wherein locating the second key includes comparing the first key to the plurality of keys in the block of keys and determining that the second key matches the first key; and obtaining a value of the respective values using the second key.

2. The computer system of claim 1, wherein:
the first key corresponds to a first segment of data for a file on a source disk image on a source node,
each key of the block of keys corresponds to corresponding segment of data on a destination node, and
the value is used to generate a portion of a copy of the file for a destination disk image during a migration of the source disk image from the source node to the destination node.

3. The computer system of claim 1, wherein the second key corresponds to an address of the value.

4. The computer system of claim 3, wherein determining the address of the value includes using a position of the second key in the block of keys, a total number of keys in the block of keys, and the block address of the block of keys.

5. The computer system of claim 1, wherein locating the second key in the block of keys includes searching the block of keys after the block of keys are read from the disk storage and stored in memory.

6. The computer system of claim 1, wherein fingerprints of the keys in the block of keys are stored in memory.

7. The computer system of claim 6, the one or more programs further including instructions for:
in accordance with a determination that a fingerprint of the first key matches a fingerprint of a key in the block of keys, obtaining the respective value that corresponds to the fingerprint of the key in the block of keys; and
in accordance with a determination that the fingerprint of the first key does not match the fingerprint of the key in the block of keys, comparing the fingerprint of the first key with a fingerprint of another key in the block of keys.

8. A non-transitory computer-readable storage medium storing one or more programs configured to be executed by one or more processors, the one or more programs including instructions for:
receiving a first key associated with data;
obtaining, from memory, a block address of a block of keys, wherein the block address corresponds to an address on disk storage corresponding to the block of keys, and wherein each key of a plurality of keys in the block of keys correspond to a respective value stored on the disk storage;
obtaining, from the disk storage, the block of keys using the block address;
locating a second key in the block of keys, wherein locating the second key includes comparing the first key to the plurality of keys in the block of keys and determining that the second key matches the first key; and
obtaining a value of the respective values using the second key.

9. The non-transitory computer-readable storage medium of claim 8, wherein:
the first key corresponds to a first segment of data for a file on a source disk image on a source node,
each key of the block of keys corresponds to corresponding segment of data on a destination node, and
the value is used to generate a portion of a copy of the file for a destination disk image during a migration of the source disk image from the source node to the destination node.

10. The non-transitory computer-readable storage medium of claim 8, wherein the second key corresponds to an address of the value.

11. The non-transitory computer-readable storage medium of claim 10, wherein determining the address of the value includes using a position of the second key in the block of keys, a total number of keys in the block of keys, and the block address of the block of keys.

12. The non-transitory computer-readable storage medium of claim 8, wherein locating the second key in the block of keys includes searching the block of keys after the block of keys are read from the disk storage and stored in memory.

13. The non-transitory computer-readable storage medium of claim 8, wherein fingerprints of the keys in the block of keys are stored in memory.

14. The non-transitory computer-readable storage medium of claim 13, the one or more programs further including instructions for:
in accordance with a determination that a fingerprint of the first key matches a fingerprint of a key in the block of keys, obtaining the respective value that corresponds to the fingerprint of the key in the block of keys; and
in accordance with a determination that the fingerprint of the first key does not match the fingerprint of the key in the block of keys, comparing the fingerprint of the first key with a fingerprint of another key in the block of keys.

15. A method, comprising:
receiving a first key associated with data;
obtaining, from memory, a block address of a block of keys, wherein the block address corresponds to an address on disk storage corresponding to the block of keys, and wherein each key of a plurality of keys in the block of keys correspond to a respective value stored on the disk storage;
obtaining, from the disk storage, the block of keys using the block address;
locating a second key in the block of keys, wherein locating the second key includes comparing the first key to the plurality of keys in the block of keys and determining that the second key matches the first key; and
obtaining a value of the respective values using the second key.

16. The method of claim 15, wherein:
the first key corresponds to a first segment of data for a file on a source disk image on a source node,
each key of the block of keys corresponds to corresponding segment of data on a destination node, and
the value is used to generate a portion of a copy of the file for a destination disk image during a migration of the source disk image from the source node to the destination node.

17. The method of claim 15, wherein the second key corresponds to an address of the value.

18. The method of claim 17, wherein determining the address of the value includes using a position of the second key in the block of keys, a total number of keys in the block of keys, and the block address of the block of keys.

19. The method of claim 15, wherein locating the second key in the block of keys includes searching the block of keys after the block of keys are read from the disk storage and stored in memory.

20. The method of claim 15, wherein fingerprints of the keys in the block of keys are stored in memory.

21. The method of claim 20, further comprising:
  in accordance with a determination that a fingerprint of the first key matches a fingerprint of a key in the block of keys, obtaining the respective value that corresponds to the fingerprint of the key in the block of keys; and
  in accordance with a determination that the fingerprint of the first key does not match the fingerprint of the key in the block of keys, comparing the fingerprint of the first key with a fingerprint of another key in the block of keys.

* * * * *